(12) United States Patent
Levi et al.

(10) Patent No.: US 12,726,499 B2
(45) **Date of Patent: *Sep. 1, 2026**

(54) SYSTEM AND METHOD FOR TRAFFIC-BASED COMPUTING INTERFACE MISCONFIGURATION DETECTION

(71) Applicant: Noname Gate Ltd., Tel Aviv-Jaffa (IL)

(72) Inventors: Shay Levi, Tel Aviv (IL); Oz Golan, Ramat Gan (IL); Oren Shpigel, Tel Aviv (IL); Aner Morag, Tel Aviv (IL); Dor Dankner, Tel Aviv (IL); Ron Martziano, Ramat Gan (IL); Pavel Vaks, Tel Aviv (IL); Hila Zigman, Ramat Gan (IL); Netanel Maman, Mazkeret Batya (IL); Yuval Alkalai Tavori, Ramat Gan (IL)

(73) Assignee: Akamai Technologies, Inc., Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/680,336

(22) Filed: May 31, 2024

(65) Prior Publication Data

US 2024/0323214 A1 Sep. 26, 2024

Related U.S. Application Data

(63) Continuation of application No. 17/505,973, filed on Oct. 20, 2021, now Pat. No. 12,034,752.

(51) Int. Cl.
*H04L 9/40* (2022.01)

(52) U.S. Cl.
CPC ...... *H04L 63/1425* (2013.01); *H04L 63/0236* (2013.01); *H04L 63/1416* (2013.01); *H04L 63/145* (2013.01); *H04L 63/20* (2013.01)

(58) Field of Classification Search
None
See application file for complete search history.

(56) References Cited

U.S. PATENT DOCUMENTS 9,477,584 B2 10/2016 Hong
9,853,996 B2 12/2017 Eliyahu et al.
(Continued)

FOREIGN PATENT DOCUMENTS

AU 2017269110 B2 10/2019

OTHER PUBLICATIONS

"International Search Report for NGTE P1875PCT". From Israel Patent Office, dated Mar. 17, 2024. Searching Authority Israel Patent Office, Jerusalem, Israel.

(Continued)

*Primary Examiner* — Nelson S. Giddins
(74) *Attorney, Agent, or Firm* — David H. Judson

(57) ABSTRACT

A system and method for traffic-based misconfiguration detection. A method includes analyzing a first set of computing interface traffic data to identify types of data included among traffic to and from a computing interface; creating at least one computing interface schema based on the analysis, wherein each computing interface schema defines a plurality of schema fields and a plurality of corresponding schema values, wherein each schema value indicates a normal behavior for the computing interface with respect to the corresponding schema field; and identifying a misconfiguration of the computing interface based on the at least one computing interface schema and a second set of computing interface traffic data.

19 Claims, 6 Drawing Sheets

(56) References Cited

U.S. PATENT DOCUMENTS

| | | | | |
|---|---|---|---|---|
| 10,193,867 | B2 | 1/2019 | Subbarayan et al. | |
| 10,678,607 | B2 | 6/2020 | Ahmed et al. | |
| 10,681,012 | B2 | 6/2020 | Subbarayan et al. | |
| 10,965,711 | B2 * | 3/2021 | Schiappa | H04L 63/20 |
| 2013/0259037 | A1 * | 10/2013 | Natarajan | H04L 43/026 370/390 |
| 2014/0201838 | A1 * | 7/2014 | Varsanyi | G06F 21/552 726/23 |
| 2020/0117523 | A1 | 4/2020 | Morrison et al. | |
| 2020/0304470 | A1 * | 9/2020 | Subbarayan | H04L 63/04 |
| 2021/0011789 | A1 | 1/2021 | Gilling | |
| 2021/0152555 | A1 * | 5/2021 | Djosic | G06N 20/00 |

OTHER PUBLICATIONS

"International Search Report for NGTE P1875PCT". From Israel Patent Office, dated Nov. 30, 2022.

Written Opinon of the International Searching Authority for PCT Application No. PCT/IB2022/059482 dated Nov. 29, 2022. The International Bureau of WIPO.

* cited by examiner

SYSTEM AND METHOD FOR TRAFFIC-BASED COMPUTING INTERFACE MISCONFIGURATION DETECTION

CROSS-REFERENCE TO RELATED APPLICATIONS

This application is a continuation of U.S. patent application Ser. No. 17/505,973 filed on Oct. 20, 2021, now allowed, the contents of which are hereby incorporated by reference.

TECHNICAL FIELD

The present disclosure relates generally to misconfiguration detection, and more specifically to detecting misconfigurations based on data in traffic to and from computing interfaces.

BACKGROUND

The vast majority of cybersecurity breaches can be traced back to an issue with a computer interface such as an application programming interface (API). API abuses are expected to become the most frequent attack vector in the future, and insecure APIs have been identified as a significant threat to cloud computing.

An API is a computing interface. A computing interface is a shared boundary across which two or more separate components of a computer system exchange information. Computing interfaces therefore allow disparate computing components to effectively communicate with each other despite potential differences in communication format, content, and the like. An API defines interactions between software components.

Misconfigurations in computing interfaces expose security vulnerabilities which can lead to data breaches. It is therefore critical to monitor for misconfigurations. Existing solutions using predetermined rules for detecting misconfigurations are limited in that they require explicit definitions for each computing interface. However, in modern computing infrastructures, computing interfaces are added or updated frequently, and the entity who owns the computing infrastructure may not wish to directly monitor for proper configurations. In those cases, the entity providing monitoring services may not have access to explicit configuration requirements.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for traffic-based misconfiguration detection. The method comprises: analyzing a first set of computing interface traffic data to identify types of data included among traffic to and from a computing interface; creating at least one computing interface schema based on the analysis, wherein each computing interface schema defines a plurality of schema fields and a plurality of corresponding schema values, wherein each schema value indicates a normal behavior for the computing interface with respect to the corresponding schema field; and identifying a misconfiguration of the computing interface based on the at least one computing interface schema and a second set of computing interface traffic data.

Certain embodiments disclosed herein also include a non-transitory computer readable medium having stored thereon causing a processing circuitry to execute a process, the process comprising: analyzing a first set of computing interface traffic data to identify types of data included among traffic to and from a computing interface; creating at least one computing interface schema based on the analysis, wherein each computing interface schema defines a plurality of schema fields and a plurality of corresponding schema values, wherein each schema value indicates a normal behavior for the computing interface with respect to the corresponding schema field; and identifying a misconfiguration of the computing interface based on the at least one computing interface schema and a second set of computing interface traffic data.

Certain embodiments disclosed herein also include a system for traffic-based misconfiguration detection. The system comprises: a processing circuitry; and a memory, the memory containing instructions that, when executed by the processing circuitry, configure the system to: analyze a first set of computing interface traffic data to identify types of data included among traffic to and from a computing interface; create at least one computing interface schema based on the analysis, wherein each computing interface schema defines a plurality of schema fields and a plurality of corresponding schema values, wherein each schema value indicates a normal behavior for the computing interface with respect to the corresponding schema field; and identify a misconfiguration of the computing interface based on the at least one computing interface schema and a second set of computing interface traffic data.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1A:
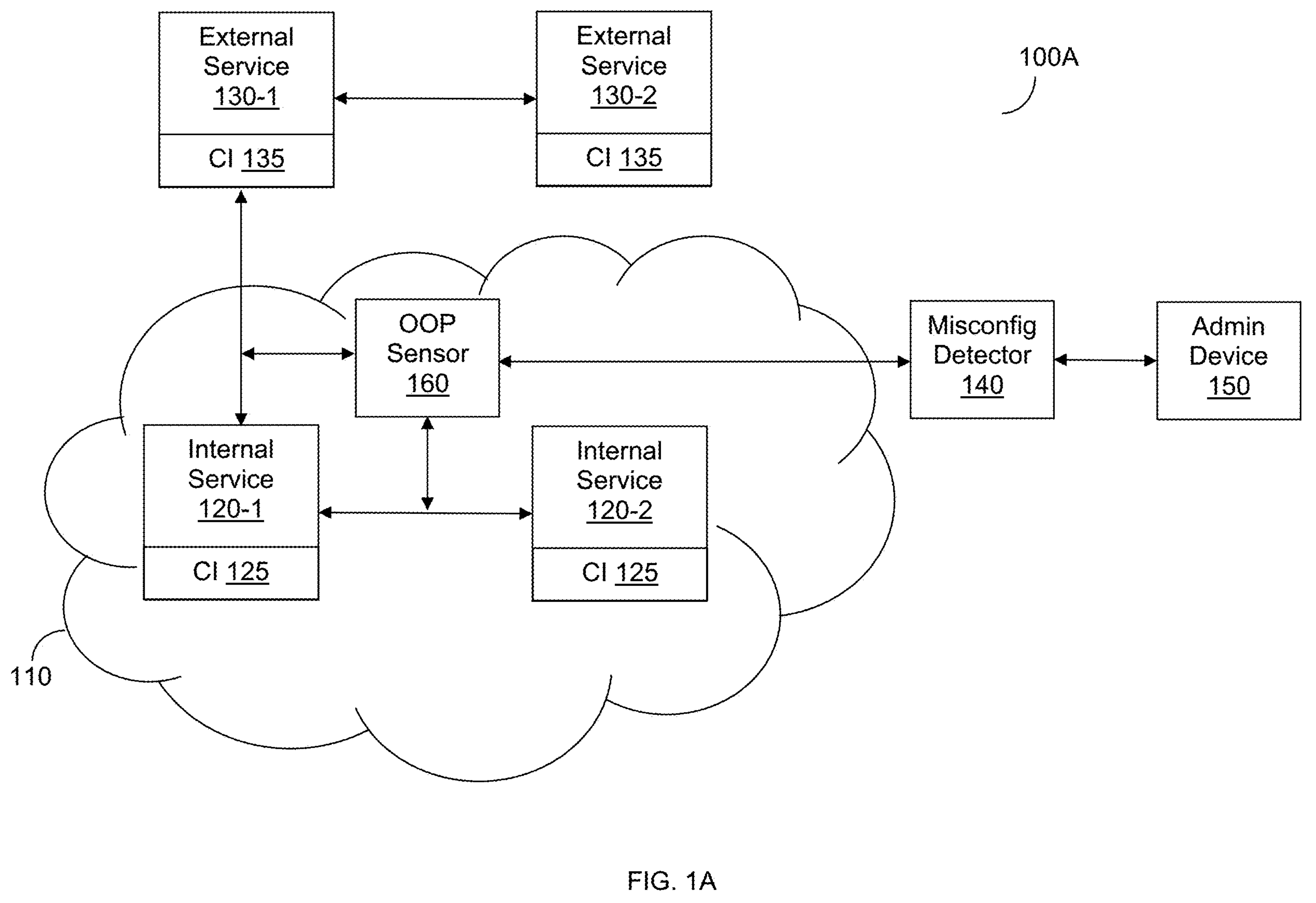
FIGS. 1A-1C are network diagrams utilized to describe various disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

In light of the challenges noted above, it has been identified that traffic to and from computing interfaces contains data which can be utilized to determine whether a computing interface is configured correctly using implicit definitions of behavior for properly configured computing interfaces. To this end, the disclosed embodiments include techniques for creating computing interface schemas based on computing interface calls and using such schemas to detect misconfigurations. The disclosed traffic-based misconfiguration techniques allow for detecting misconfigurations based on traffic data related to computing interfaces without requiring analysis of or explicit information about the configuration of a computing interface or a component which manages communications via computing interfaces such as an Application Programming Interface (API) gateway.

The various disclosed embodiments include a method and system for traffic-based computing interface misconfiguration detection. Initial computing interface traffic is analyzed to identify potential protected data. Based on the analysis of the initial computing interface traffic, one or more computing interface schema are created. Subsequent computing interface traffic is analyzed with respect to the computing interface schema in order to identify misconfigurations in computing interfaces. When a misconfiguration is detected, one or more mitigation actions may be performed.

Figure 1B:
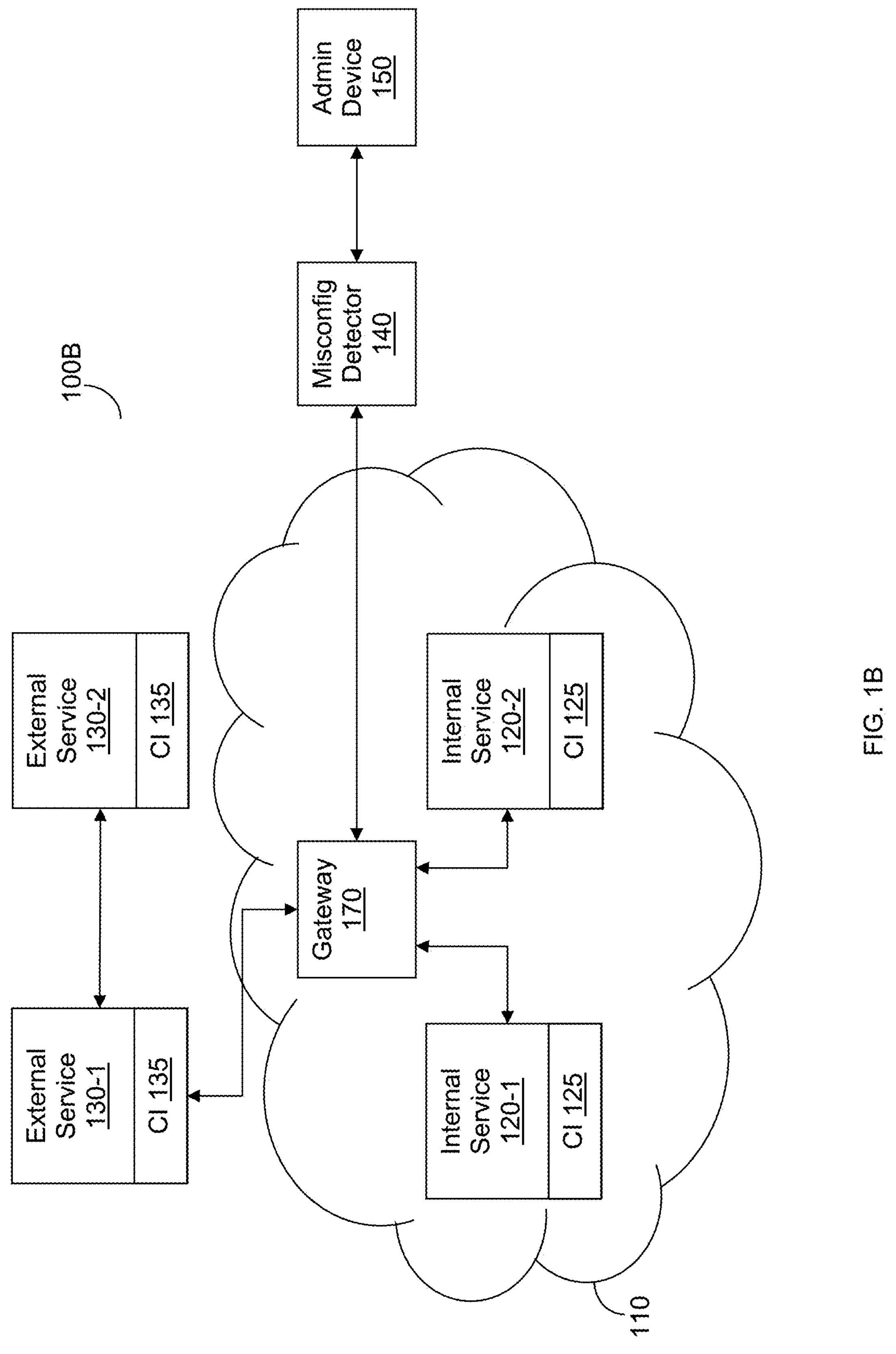
Figure 1C:
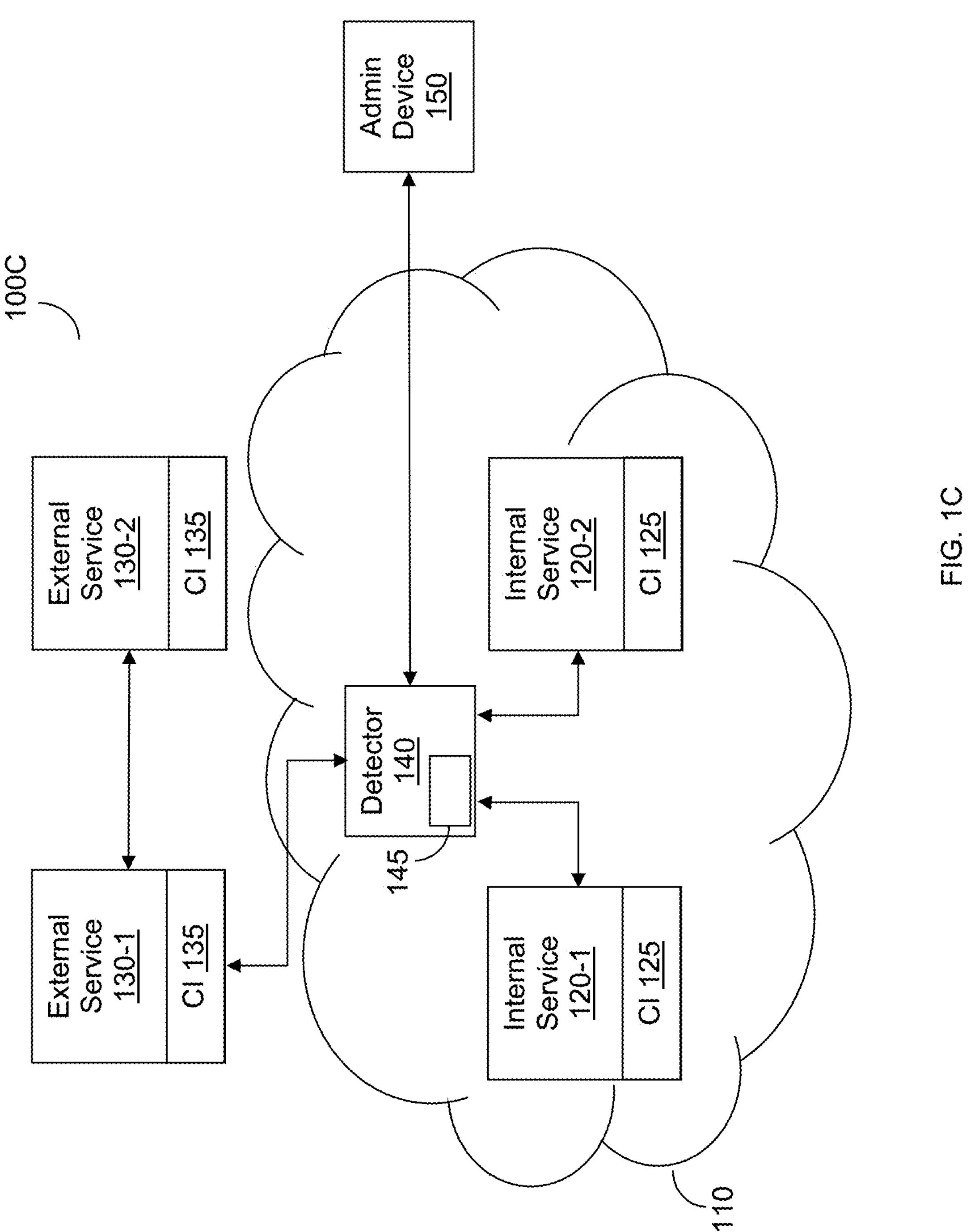

FIGS. 1A-C show example network diagrams 100A-C utilized to describe various disclosed embodiments. In each of FIGS. 1A-C, internal services 120-1 and 120-2 (which may be referred to individually as an internal service 120 or collectively as internal services 120) communicate with each other and/or with external services 130-1 and 130-2 (which may be referred to individually as an external service 130 or collectively as external services 130). The internal services 120-1 and 120-2 are services hosted on a network 110. Each of the internal services 120 communicates at least using a respective communications interface (CI) 125 and each of the external services 130 communicates at least using a respective communications interface (CI) 135. The communication interfaces 125 and 135 may be, but are not limited to, Application Programming Interfaces (APIs).

The network 110 may be, but is not limited to, a wireless, cellular or wired network, a local area network (LAN), a wide area network (WAN), a metro area network (MAN), the Internet, the worldwide web (WWW), similar networks, and any combination thereof. The network 110 may be operated by an organization (e.g., by including servers owned by the organization), or may be operated by another entity (e.g., a cloud provider or other provider of network computing services). It should be noted that a single network 110 is depicted merely for simplicity purposes, but that the internal services 120 may communicate via multiple networks and/or other connections in accordance with the disclosed embodiments.

FIG. 1A depicts an out of band implementation. In FIG. 1A, an out of path (OOP) sensor 160 is deployed out of path of the communicating services 120 and 130. In an example implementation, the out of path sensor 160 is configured to duplicate computing interface traffic between the computing interfaces 125 and/or 135, and to send the duplicated traffic to the misconfiguration detector 140 for analysis.

FIG. 1B depicts a gateway plugin implementation. In FIG. 1B, a gateway 170 is deployed in line between the internal services 120 and between the internal service 120-1 and the external services 130-1. The gateway 170 may be, but is not limited to, an API gateway. The gateway 170 is configured to receive requests and responses from any of the services 120 and/or 130, and to forward those requests and responses to appropriate destinations. The gateway 170 may be further configured to enforce one or more policies with respect to traffic. In the example implementation shown in FIG. 1B, the gateway 170 is configured to send a copy of each request and response to the misconfiguration detector 140 for analysis. When the traffic between the computing interfaces 125 and/or 135 is encrypted, the gateway 170 may be further configured to decrypt the traffic data before transmitting such data to the misconfiguration detector 140.

FIG. 1C depicts an in line implementation. In FIG. 1C, the misconfiguration detector 140 is deployed in line between the internal services 120 and between the internal service 120-1 and the external services 130-1. The misconfiguration detector 140 is configured to analyze requests and responses as described herein in order to detect misconfigurations in the computing interfaces 125 and/or 135. To this end, the misconfiguration detector 140 may include a sensor module 145 configured to duplicate traffic as described herein. The misconfiguration detector 140 may be further configured to act as a gateway by forwarding requests and responses to appropriate destinations, decrypting traffic, or both.

The misconfiguration detector 140 is configured to detect computing interface misconfigurations as described herein, and may be configured to send data indicating the detected anomalies and/or the supplemental data to the admin device 150 for display.

It should be noted that the particular network configurations shown in FIGS. 1A-C are merely utilized to illustrate various example deployments of the misconfiguration detector 140 and that the disclosed embodiments may be applied to other network configurations without departing from the scope of the disclosure. As some particular examples, different numbers of internal services 120, external services 130, or both, may communicate amongst each other, and the misconfiguration detector 140 may be deployed such that it can identify anomalies in any or all such communications. In such implementations, multiple anomaly detectors may be utilized. Additionally, the misconfiguration detector 140 may be implemented as a system (e.g., a server), as a virtual machine, as a software container or other self-contained software package, and the like. Further, although the misconfiguration detector 140 is described in various embodiments as duplicating traffic, the misconfiguration detector 140 is not necessarily configured as such and traffic duplication may be performed by another system without departing from the scope of the disclosed embodiments.

It should also be noted that the misconfiguration detector 140 is depicted as outside of the organization's network 110 in FIGS. 1A-B merely for simplicity purposes, and that the particular location of deployment of the misconfiguration detector 140 may vary in at least some implementations. As non-limiting examples, the misconfiguration detector 140 may be realized as a software-as-a-service (Saas) managed in a separate cloud environment from the network 110, via accessing a shared cloud account that is also accessible to systems of the network 110, or on premises (e.g., in the network 110 or otherwise in physical or network proximity to the services 120), and the like.

Figure 2:
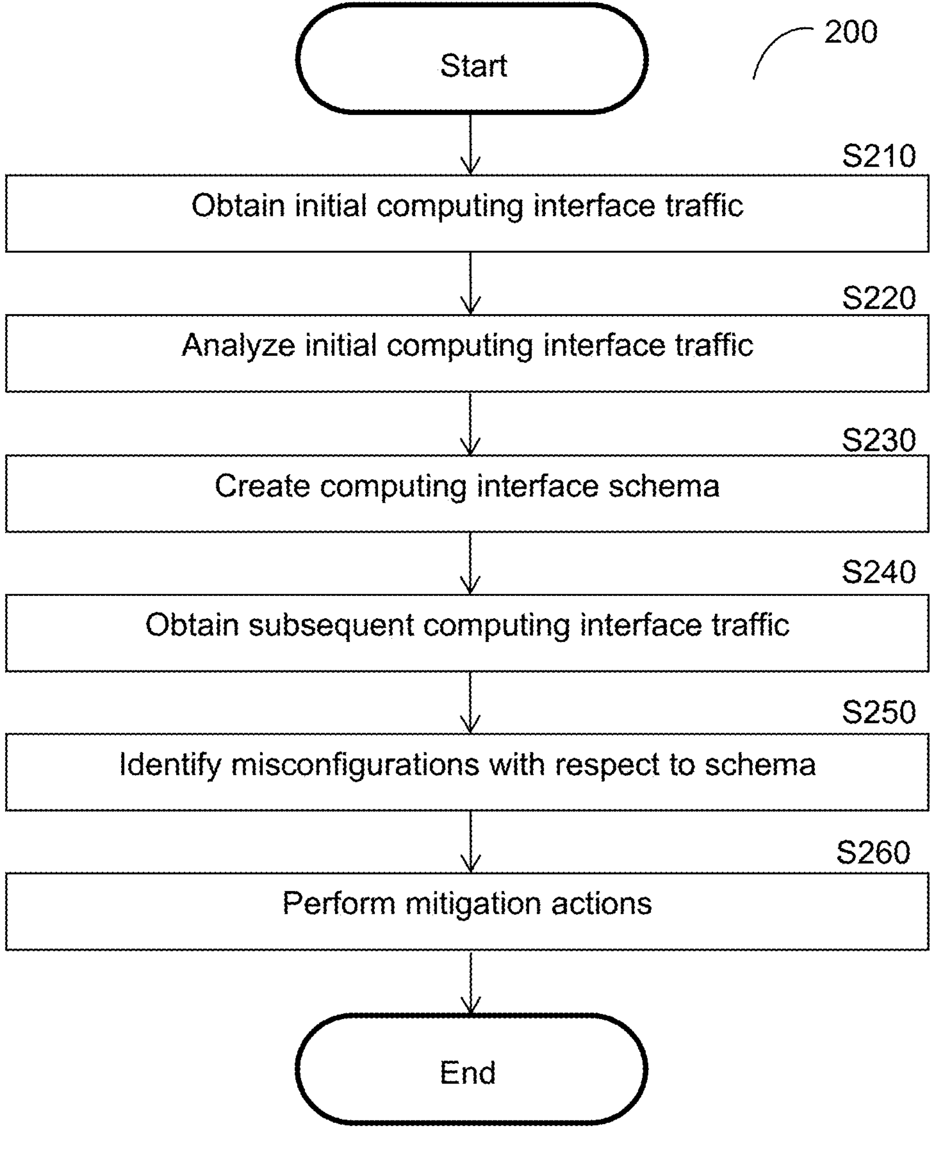
FIG. 2 is a flowchart illustrating a method for traffic-based misconfiguration detection according to an embodiment.

FIG. 2 is a flowchart 200 illustrating a method for traffic-based computing interface misconfiguration detection according to an embodiment. In an embodiment, the method may be performed by the misconfiguration detector 140, FIGS. 1A-C.

At S210, an initial set of computing interface traffic data is obtained. The computing interface traffic data includes computing interface traffic to and from a computing interface such as, but not limited to, an application programming interface (API). To this end, the data may include, but is not limited to, requests and responses of calls to computing interfaces (i.e., requests sent as part of calls to computing interfaces and responses to those requests). The initial set of computing interface traffic data is effectively utilized to establish a schema demonstrating behavior indicating certain configuration of the computing interface to and from which the computing interface calls are made.

In an embodiment, the computing interface traffic data may include duplicated traffic. To this end, in some embodiments, S220 may further include duplicating traffic. A non-limiting example method demonstrating how such duplicated traffic may be obtained is described below with respect to FIG. 3. Such an example method may be utilized to effectively duplicate intra-organization traffic in order to provide access to traffic that would not otherwise be obtainable, thereby allowing for improving the schema and, consequently, the accuracy of the misconfiguration detection described herein using such newly obtainable data.

At S220, the initial set of computing interface traffic data is analyzed to identify types of data including fields and values of interest among traffic to and from the computing interface. The analysis may include analysis of headers, bodies, query strings, path parameters, and other components of requests and responses. In this regard, it has been identified that trends in computing interface behavior can be analyzed statistically in order to establish normal behavior for computing interfaces with respect to traffic. These normal behaviors, in turn, may be utilized to determine whether a computing interface is misconfigured based on analysis of subsequent traffic to and from the computing interface.

The fields and values of interest are fields and values included in requests and responses of computing interface calls. These fields and values of interest are indicative of how the computing interface behaves vis-a-vis calls to the computing interface. The fields of interest indicate information included in the data such as, but not limited to, header information (e.g., channels by which data is communicated, protocols used for communicating data, communication method [e.g., POST], etc.), body information (e.g., email address, mailing address, social security number, phone number, etc.), combinations thereof, and the like. The values of interest include the actual data provided for those fields.

In an embodiment, S220 may further include identifying the absence of certain fields, values, or both. As a non-limiting example, to determine authentication status (e.g., a data type which may have values of either "authenticated" or "not authenticated"), it may be determined whether some form of authentication credentials is included in requests such that, when such credentials are not included in a request, the absence of credentials (and, consequently, a lack of authentication) is identified.

In an embodiment, the analysis at S220 includes a statistical analysis of the fields and values of interest of various requests and responses in order to establish a normal behavior of the computing interface with respect to the fields and values of interest. Such normal behavior may be defined with respect to information such as, but not limited to, whether values certain fields are normally included or populated in requests to and responses from the computing interface (e.g., whether an email field is normally included), data types of data normally used for values of respective fields (e.g., String, integer, etc.), whether certain fields are optional (i.e., the field is often included but not always), specific values for certain fields (e.g., either "authenticated" or "not authenticated"), combinations thereof, and the like.

In an example implementation, whether a field or value of interest is normally included is determined based on whether requests to the computing interface, responses from the computing interface, or both, are included in at least a threshold proportion of the requests, responses, or both. Likewise, whether a field is optionally included may be determined based on a threshold proportion of the requests, responses, or both, including the potentially optional field. Similarly, a normal value for a field may be determined based on a threshold proportion of the requests, responses, or both, including the normal value for that field. Each of the above-noted thresholds may be, but is not necessarily, a different number than that of the other thresholds.

In another embodiment, S220 may further include identifying specific kinds of protected data included in requests, responses, or both. The specific kinds of protected data may be predetermined and may be based on user inputs, and are kinds of data for which additional precautions should be taken in order to ensure that the data is not leaked due to their sensitive nature. Such precautions may include, but are not limited to, requiring authentication when they are sent. The precautions may be indicated in the requests and responses such that misconfigurations can be detected based on the absence of such precautions when certain kinds of protected data are included in requests and responses for the computing interface.

In a further embodiment, S220 further includes analyzing the initial set of computing interface traffic to determine whether certain precautions are valid as additional precautions when considered in context of the initial set of computing interface traffic. As a non-limiting example, when a particular precaution (e.g., embedding an API key in an application or using a particular token) is taken in at least a threshold amount or proportion of the initial set of computing interface traffic, that precaution is determined to be insufficient as an additional precaution such that a misconfiguration is detected when the precautions indicated in a given portion of traffic including protected data only include precautions that were determined as insufficient additional precautions.

At S230, one or more computing interface schema are created based on the analysis. The created computing interface schemas define a plurality of schema fields having corresponding schema values indicating normal behavior of the computing interface with respect to computing interface calls, and may include different computing interface schemas for requests and responses. Each schema value may be, but is not limited to, a specific value (e.g., "0," "1," "yes," "no," "true," "false," etc.), a data type (e.g., String, float, integer, etc.), and the like.

Each computing interface schema may include optional schema values having a predetermined optional marker indicating information which is routinely, but not always or predominantly, included in requests to or responses from the computing interface. In other words, such an optional marker indicates that the corresponding field and value are normal but are optionally included, i.e., may or may not be included in any given request or response.

As a non-limiting example, a schema for responses from a computing interface may be formatted as follows:

| Example response schema |
|---|
| Authenticated= no<br>Headers= [unknown]<br>Body:<br>email?= [String]<br>address?= [String]<br>phone?= [number] |

In the example response schema shown above, the schema indicates that responses from the computing interface are normally not authenticated, that specific header information for responses is unknown, and that the body of the response optionally (indicated by a "?" acting as the optional marker) includes fields for email address, mailing address, and phone number. The values for optional fields "email" and "address" are normally formatted using Strings, while the values for the optional field "phone" is normally formatted using a number.

At S240, a subsequent set of computing interface traffic data is obtained. The subsequent set of computing interface traffic data may be obtained similarly to how the initial set of computing interface traffic data is obtained per S210.

At S250, the subsequent set of computing interface traffic data is analyzed with respect to the created computing interface schema in order to identify one or more misconfigurations in computing interfaces represented by respective computing interface schema.

In an embodiment, the misconfigurations are identified based on one or more misconfiguration rules. The misconfiguration rules include rules defining combinations of schema characteristics and traffic characteristics that are indicative of misconfigurations and can therefore be utilized to identify misconfigurations. Each such combination includes at least one field and corresponding value of a schema as well as at least one field and corresponding value of traffic.

In a further embodiment, the misconfiguration rules may further be based on definitions of specific kinds of data requiring additional precautions, potentially unsafe protocols, potentially insecure channels, combinations thereof, and the like. Such definitions may be predefined, and may be determined based on user inputs. As a non-limiting example, social security number may be predefined as a kind of data that is sensitive and therefore requires additional precautions in the form of authentication (e.g., via a username and password combination for an admin or similarly authorized individual).

Non-limiting examples for misconfiguration rules follow.

As a first example misconfiguration rule, the combination of a schema indicating a communication method of DELETE for HTTP requests and subsequent traffic including data sent via the DELETE method is defined as indicating a misconfiguration. In this regard, it is noted that data sent via the DELETE method may allow the sender to perform changes on a backend server without requiring authentication, thereby allowing for unauthorized access to the backend server.

As a second example misconfiguration rule, the combination of a schema indicating that the requests do not require authentication and subsequent responses including mailing address information is defined as indicating a misconfiguration.

As a third example misconfiguration rule, the combination of a schema indicating a potentially unsafe protocol (e.g., HTTP as indicated in a predetermined definition of potentially unsafe protocols) is defined as indicating a misconfiguration.

At S260, one or more mitigation actions are performed with respect to the identified misconfigurations. The mitigation actions may include, but are not limited to, blocking traffic via misconfigured computing interfaces, blocking traffic to and from components using misconfigured computing interfaces, reconfiguring the misconfigured computing interfaces such that they are correctly configured (e.g., by changing a configuration that does not require authentication to a configuration that does require authentication or by placing a web application firewall configuration in front of an API server), lowering a rate limit number, generating a notification including a recommendation to reconfigure the component using the computing interface, combinations thereof, and the like.

In an embodiment, the mitigation actions to be performed may be determined based on learned normal behavior (for example, normal behavior reflected in the initial set of computing interface traffic data which is utilized to create the schema).

It should be noted that FIG. 2 is described with respect to identifying misconfigurations in a single computing interface merely for simplicity purposes, but that multiple instances of the process described with respect to FIG. 2 may be performed in series or in parallel such that traffic related to multiple computing interfaces can be analyzed and utilized to detect misconfigurations without departing from the scope of the disclosure.

Figure 3:
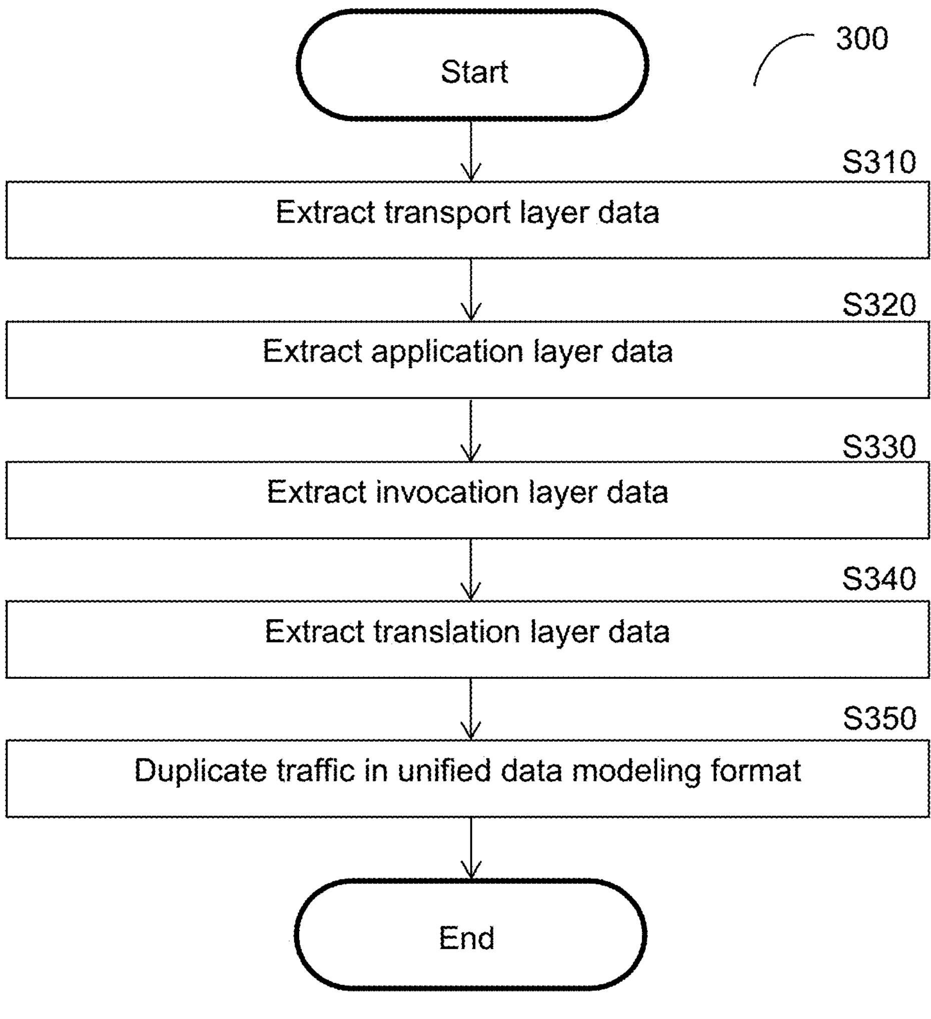
FIG. 3 is a flowchart illustrating a method for duplicating traffic according to an embodiment.

FIG. 3 is a flowchart 300 illustrating a method for duplicating traffic according to an embodiment.

At steps S310 through S340, data is extracted from various communication protocol layers used for communication between communications interfaces. For each layer, a respective set of rules for extracting data from that layer is applied to data communicated via that layer in order to extract data from that layer. Further, some of the layers may be built based on the data extracted from other layers. As a non-limiting example, when the layers include a transport layer, an application layer, an invocation layer, and a translation layer, data extracted from the transport layer may be used in building the application layer, data extracted from the application layer may be used in building the invocation layer, and data extracted from the invocation layer may be used in building the translation layer.

The set of rules for each layer defines fields which include data to be extracted regardless of the formatting used for those fields. In a further embodiment, the rules define fields such that data extracted from those fields includes protocol-specific data (i.e., data which is only used for a particular protocol). By only extracting such protocol agnostic data and duplicating the traffic based on that protocol agnostic data, the duplicated traffic itself is protocol agnostic and can be analyzed regardless of the protocol used for the original traffic.

To this end, the set of rules for each layer may include key words or other indicators that uniquely identify headers of particular fields such that, when those indicators are included in a field, it can be determined whether to extract data from that field. Alternatively or collectively, the set of rules for each layer may include applying a machine learning model trained to identify comparable data with respect to training data for that respective layer.

The data extracted for each layer may more specifically include data needed to build higher layers, metadata utilized for use in duplicating the traffic, both, and the like. The set of rules for each layer may further define which fields include data for building higher layers and which fields include metadata.

At S310, data is extracted from a transport layer. Extracting the data from the transport layer may include, but is not limited to, reconstructing communications according to the Transmission Control Protocol (TCP) or other transport layer protocol. To this end, S310 may further include segmenting traffic into different sessions and ordering the packets. The data is extracted from the ordered packets.

At S320, data is extracted from an application layer. Extracting the data from the application layer may include, but is not limited to, parsing Hypertext Transfer Protocol (HTTP) packets. To this end, S320 may further include splitting the packets into sessions, each session made of a request-response pair.

Figure 4:
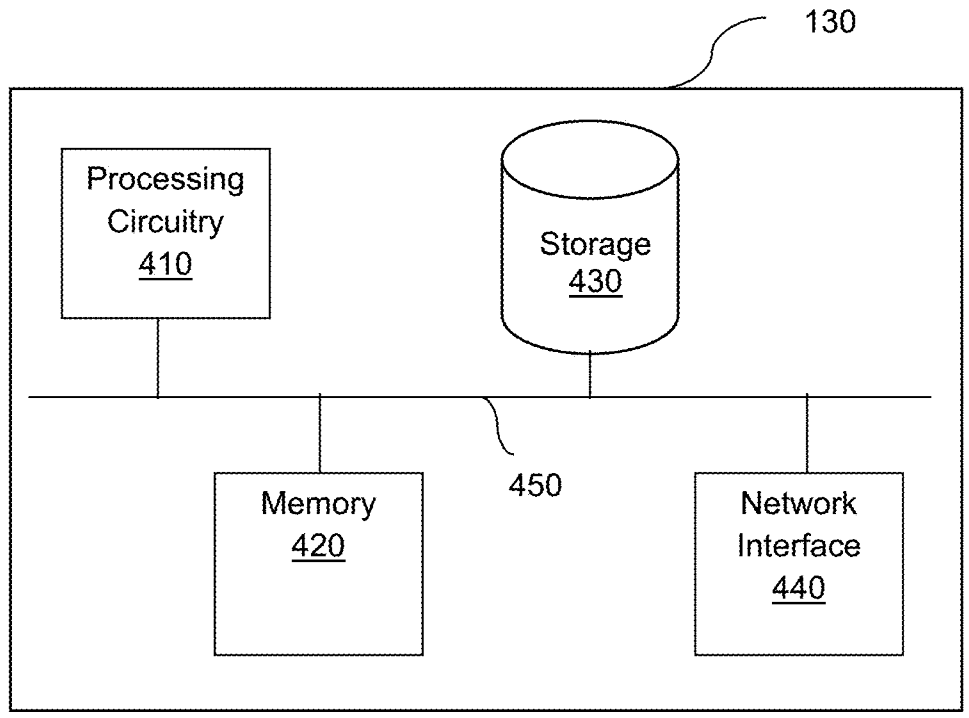
FIG. 4 is a schematic diagram of a misconfiguration detector according to an embodiment.

In an embodiment where the system performing traffic duplication is not deployed in line between communications interfaces or otherwise when the system performing traffic duplication does not have access to the raw communications data (e.g., when the system is deployed out of line and receives incomplete communications data from an API gateway that is deployed in line such that the system does not have access to the complete set of request-response pairs), duplicating the traffic may further include performing a full session reconstruction as described further below with respect to FIG. 4. Such a full session reconstruction provides the request-response pairs needed for application layer data extraction.

At S330, data is extracted from an invocation layer. The invocation layer is a layer which includes invocation of functions or paths by a higher layer (e.g., the translation layer). In an embodiment, S330 includes identifying invocations of functions or paths.

Whether to identify invocations of functions or paths may be determined by identifying a type of communication framework (e.g., a type of remote procedure call or software architectural style) used for communications. To this end, the set of rules applied to the invocation layer may further include rules for identifying the type of communication framework and rules to be applied to communications according to different communication frameworks. Example communication frameworks may include, but are not limited to, Representational state transfer (REST), Simple Object Access Protocol (SOAP), gRPC Remote Procedure Calls (gRPC), GraphQL, and the like.

As a non-limiting example, for communications according to gRPC, the extracted data may include the name of a function that is invoked by the Protocol Buffers layer (i.e., the translation layer for gRPC). Such function name data may proceed to be used to build the Protocol Buffers layer. As another non-limiting example, for communications according to REST (which does not involve invoking functions), the extracted data may include the name of a path that is invoked by the translation layer.

At S340, data is extracted from a translation layer. The translation layer may be responsible for translating data by structuring the data into a particular format for storage or other subsequent use. Like for the invocation layer, the data may be stored in a protocol-specific format that varies depending on the communication framework being utilized and, therefore, the rules for extracting data from the translation data may include different sets of rules for different communication frameworks.

As a non-limiting example for the layers noted above, when a remote procedure call used for communications between two computing interfaces is gRPC, the transport layer is a TCP layer, the application layer is a HTTP 2 layer, the invocation layer is a gRPC layer, and the translation layer may be a Protocol Buffers Layer.

At S350, the traffic is duplicated based on the data extracted at each layer as described above with respect to S310 through S340. In an embodiment, the traffic is duplicated by converting the extracted data into a unified data modeling format. The unified data modeling format includes data related to the traffic which is protocol-agnostic, that is, the data is formatted such that subsequent use and processing of the data does not depend on the protocols which are used to communicate the data.

It should be noted that the extraction of data described above with respect to S310 through S340 includes extracting data from specific layers, but that the disclosed embodiments are not necessarily limited to these specific layers. In at least some other embodiments, data may be extracted from more or different layers than the layers mentioned above.

FIG. 4 is an example schematic diagram of a misconfiguration detector 140 according to an embodiment. The misconfiguration detector 140 includes a processing circuitry 410 coupled to a memory 420, a storage 430, and a network interface 440. In an embodiment, the components of the misconfiguration detector 140 may be communicatively connected via a bus 450.

The processing circuitry 410 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 420 may be volatile (e.g., random access memory, etc.), non-volatile (e.g., read only memory, flash memory, etc.), or a combination thereof.

In one configuration, software for implementing one or more embodiments disclosed herein may be stored in the storage 430. In another configuration, the memory 420 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 410, cause the processing circuitry 410 to perform the various processes described herein.

The storage 430 may be magnetic storage, optical storage, and the like, and may be realized, for example, as flash memory or other memory technology, compact disk-read only memory (CD-ROM), Digital Versatile Disks (DVDs), or any other medium which can be used to store the desired information.

The network interface 440 allows the misconfiguration detector 140 to communicate with, for example, the internal services 120, the external services 130, the admin device 150 combinations thereof, and the like.

It should be understood that the embodiments described herein are not limited to the specific architecture illustrated in FIG. 4, and other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for traffic-based misconfiguration detection, comprising:

analyzing a first set of computing interface traffic data to identify types of data included among traffic to and from a computing interface;

creating at least one computing interface schema based on the analysis, wherein the computing interface schema defines a plurality of schema fields and a plurality of corresponding schema values, wherein each schema value indicates a normal behavior for the computing interface with respect to the corresponding schema field; and identifying a misconfiguration of the computing interface based on the at least one computing interface schema and a second set of computing interface traffic data;

wherein the computing interface schema is created without requiring analysis or explicit information of a configuration of the computing interface or any component that manages communications to the computing interface.

2. The method of claim 1, further comprising:

performing at least one mitigation action with respect to the computing interface based on the identified misconfiguration.

3. The method of claim 1, wherein the at least one computing interface schema includes at least one request schema and at least one response schema.

4. The method of claim 1, wherein at least one of the first set of computing interface traffic data and the second set of computing interface traffic data includes duplicated traffic.

5. The method of claim 4, wherein the duplicated traffic is created based on data extracted from a communications session by building at least one of a plurality of communication protocol layers based on data extracted from other layers of the plurality of communication protocol layers.

6. The method of claim 1, wherein the plurality of schema fields for the computing interface schema includes at least one field having a predetermined optional marker indicating that the respective schema field is optionally included in any given request or response of traffic to and from the computing interface.

7. The method of claim 1, wherein the misconfiguration is identified based further on at least one predetermined kind of protected data for which additional precautions are required.

8. The method of claim 7, wherein the at least one computing interface schema includes a first schema value for a corresponding first schema field representing authentication status, wherein the identified misconfiguration is based on a combination of the first schema value for the at least one computing interface schema indicating a lack of required authentication and a portion of the second set of computing interface traffic data including one of the at least one predetermined kind of protected data.

9. The method of claim 1, further comprising:

duplicating traffic to and from the computing interface, wherein duplicating the traffic includes extracting data from a plurality of communication protocol layers used for communications with the computing interface, wherein the first set of computing interface traffic data includes the duplicated traffic.

10. A non-transitory computer readable medium having stored thereon instructions for causing a processing circuitry to execute a process, the process comprising:

analyzing a first set of computing interface traffic data to identify types of data included among traffic to and from a computing interface;

creating at least one computing interface schema based on the analysis, wherein the computing interface schema defines a plurality of schema fields and a plurality of corresponding schema values, wherein each schema value indicates a normal behavior for the computing interface with respect to the corresponding schema field; and identifying a misconfiguration of the computing interface based on the at least one computing interface schema and a second set of computing interface traffic data;

wherein the computing interface schema is created without requiring analysis or explicit information of a configuration of the computing interface or any component that manages communications to the computing interface.

11. A system for traffic-based misconfiguration detection, comprising:

a processing circuitry; and a memory, the memory containing instructions that, when executed by the processing circuitry, configure the system to:

analyze a first set of computing interface traffic data to identify types of data included among traffic to and from a computing interface;

create at least one computing interface schema based on the analysis, wherein the computing interface schema defines a plurality of schema fields and a plurality of corresponding schema values, wherein each schema value indicates a normal behavior for the computing interface with respect to the corresponding schema field; and identify a misconfiguration of the computing interface based on the at least one computing interface schema and a second set of computing interface traffic data;

wherein the computing interface schema is created without requiring analysis or explicit information of a configuration of the computing interface or any component that manages communications to the computing interface.

12. The system of claim 11, wherein the system is further configured to:

perform at least one mitigation action with respect to the computing interface based on the identified misconfiguration.

13. The system of claim 11, wherein the at least one computing interface schema includes at least one request schema and at least one response schema.

14. The system of claim 11, wherein at least one of the first set of computing interface traffic data and the second set of computing interface traffic data includes duplicated traffic.

15. The system of claim 14, wherein the duplicated traffic is created based on data extracted from a communications session by building at least one of a plurality of communication protocol layers based on data extracted from other layers of the plurality of communication protocol layers.

16. The system of claim 11, wherein the plurality of schema fields for the computing interface schema includes at least one field having a predetermined optional marker indicating that the respective schema field is optionally included in any given request or response of traffic to and from the computing interface.

17. The system of claim 11, wherein the misconfiguration is identified based further on at least one predetermined kind of protected data for which additional precautions are required.

18. The system of claim 17, wherein the at least one computing interface schema includes a first schema value for a corresponding first schema field representing authentication status, wherein the identified misconfiguration is based on a combination of the first schema value for the at least one computing interface schema indicating a lack of required authentication and a portion of the second set of computing interface traffic data including one of the at least one predetermined kind of protected data.

19. The system of claim 11, wherein the system is further configured to:

duplicate traffic to and from the computing interface, wherein duplicating the traffic includes extracting data from a plurality of communication protocol layers used for communications with the computing interface, wherein the first set of computing interface traffic data includes the duplicated traffic.

* * * * *